June 14, 1932.  J. M. SHIMER  1,862,807
DRIVING MECHANISM
Filed May 2, 1929   2 Sheets-Sheet 2

Patented June 14, 1932

1,862,807

UNITED STATES PATENT OFFICE

JOHN M. SHIMER, OF WILKINSBURG, PENNSYLVANIA, ASSIGNOR TO WILSON-SNYDER MANUFACTURING COMPANY, A CORPORATION OF PENNSYLVANIA

DRIVING MECHANISM

Application filed May 2, 1929. Serial No. 359,732.

This invention relates to driving mechanisms and more particularly to a bearing or shaft supporting construction for use in connection with transmissions, power drives or the like.

Crank shafts or other forms of operating shafts such, for example, as those employed in operating pistons, plungers or other reciprocating members are generally supported intermediate their ends, and are frequently operatively connected to driving mechanism intermediate their ends, each end of the crank shaft being provided with a crank connected with a piston, plunger or the like. Where a reduction in speed is involved, the crank shaft may be geared to a suitable driving shaft which constitutes the power shaft of the assembly and which is operated by any suitable source of power. Where a crank shaft having two cranks is driven through a gear secured to the shaft between the cranks, as is the case, for example, in driving mechanism of a duplex pump or the like, the counter shaft or driving shaft extends entirely across the crank shaft housing and is supported in bearings at each end thereof, a driving gear being located in the center of the housing and meshing with the crank shaft gear. Since the crank shaft is connected intermediate its ends with the drive shaft, the drive shaft need extend but a little over half way across the frame of the machine, and may have a driving gear mounted adjacent its inner end. This presents a problem as to how the drive shaft may be supported so as to prevent vibration, yet may be left free to rotate without binding.

Accordingly, one object of this invention is to provide an improved construction and arrangement of driving mechanism in which a driving shaft having a gear mounted thereon adjacent its inner end is journalled in bearings, one of these bearings being provided by a bearing carrier extending inwardly to support the inner end of the driving shaft.

A further object is to provide driving mechanism constructed and arranged to permit reversal of the drive shaft so that the driving power can be applied thereto at either side of the associated mechanism.

Figure 1:
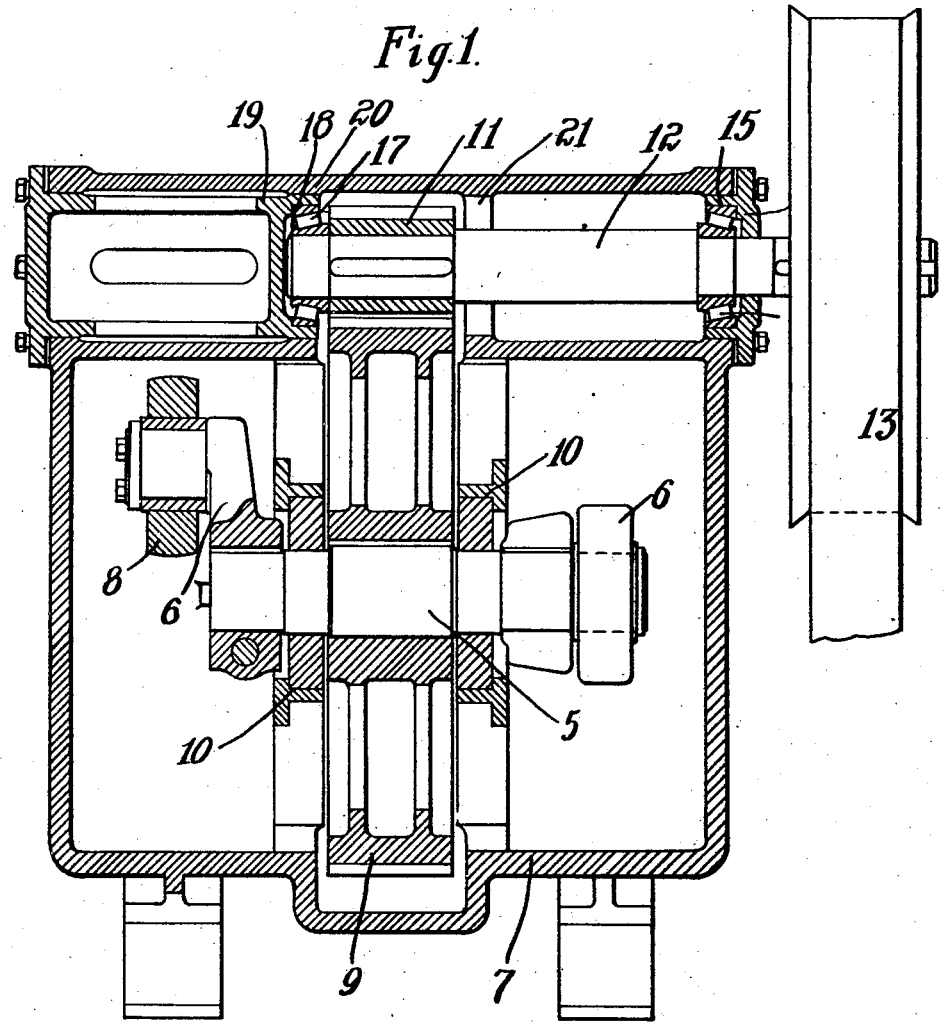
Figure 2:
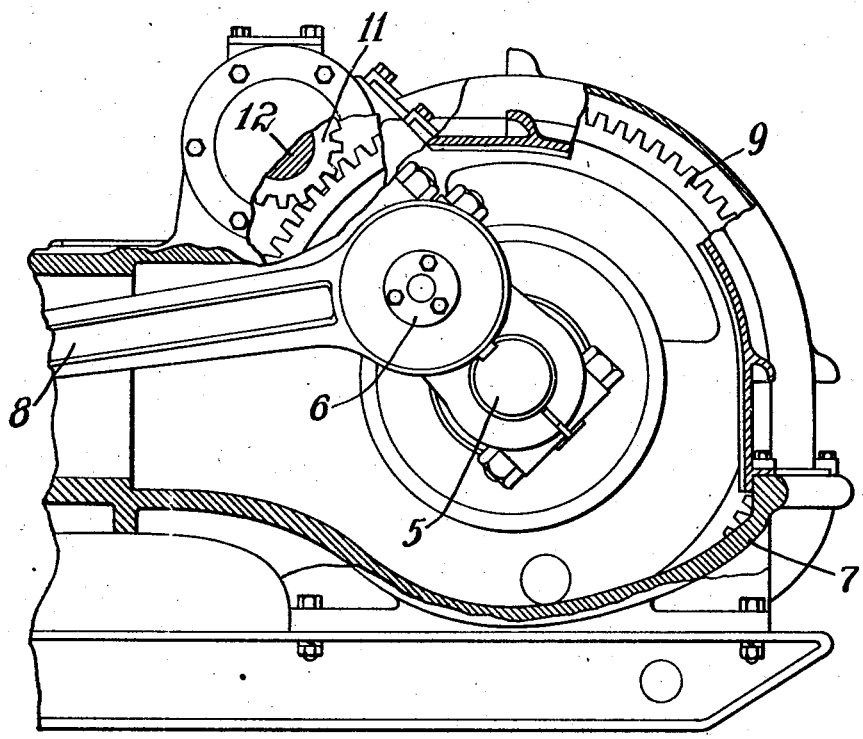

These and other objects, which will be apparent to those skilled in this particular art, are accomplished by means of the invention illustrated in the accompanying drawings in which Fig. 1 is a transverse sectional view of a crank shaft driving mechanism constructed in accordance with one embodiment of this invention and Fig. 2 is a view in elevation, partly in section and partly broken away, of the mechanism shown in Fig. 1, illustrating the application of the present invention to one form of power drive.

The particular embodiment of the present invention which has been chosen for the purpose of illustration is shown in connection with a crank shaft 5 having oppositely disposed cranks 6 mounted in a housing 7 and connected to rods 8 for driving any desired type of associated mechanism.

A crank shaft gear 9 is secured to the crank shaft 5 between supporting bearings 10 and meshes with the driving gear 11 on a drive shaft 12 which, in the present instance, is provided with a pulley 12 on the projecting end thereof, although any other form of shaft operating mechanism can obviously be employed. It will be understood, therefore, that the invention, while having its origin in the solution of a particular problem, is broadly applicable to arrangements of driving mechanism in which a drive shaft extending inwardly, and having a central gear mounted thereon, is supported adjacent the drive gear.

Instead of extending entirely across the housing 7 and being supported in the opposite sides thereof, the drive shaft 12 is of such length that the inner end is located adjacent the crank shaft gear 9 and the driving gear 11 is secured to the drive shaft adjacent the inner end thereof. A bearing, such as an anti-friction bearing 14, is positioned within the annular flange 15 of a bearing carrier 16 and forms a support for the shaft at the side of the housing adjacent the driving pulley. The inner end of the shaft is supported in a bearing such as an anti-friction bearing 17 mounted in an annular flange 18 formed on the inner end of an elongated bearing carrier 19 extending into the housing from the opposite side thereof. It is obvious that instead of the roller bearings shown at 14 and 17, other types of anti-friction bearings may be substituted. My invention is not dependent upon the particular type of bearing employed, and my invention includes broadly any bearing provided by a bearing carrier. I have shown a mechanism in which roller bearings are provided to lessen the friction, but it is clear that if these were not employed, the shaft might be directly journalled in bearing surfaces provided by the carriers 16 and 19. The inner end of the elongated bearing carrier 19 is supported by an annular supporting surface 20 which is formed in the housing, and a similar surface 21 is also formed in the housing on the opposite side of the crank shaft gear 9. As a result of this construction, it will be apparent that the drive shaft and associated mechanism is reversible so as to permit power being applied to the drive shaft from either side of the housing 7. By removing the bearing collars or closure members 16 and 19, the shaft can be withdrawn and its position reversed so as to place the pulley 13 or other driving mechanism on the opposite side of the housing 7 from that illustrated in Fig. 1. In this case the bearing supporting member 16 will be located in the opening at the left of the housing in Fig. 1 and the elongated bearing collar 19 will be positioned on the right with the bearing supporting flange 18 supported by the annular surface 21.

Although I have described in more or less detail a specific form of mechanism, it will be apparent that various changes, additions, omissions and substitutions can be made therein without departing from the spirit of this invention or the scope of the appended claims.

What I claim as new and desire to secure by Letters Patent is:

1. Driving mechanism comprising a housing having opposed openings, a shaft extending through one of said openings and journalled in a bearing carried in said opening by the housing, said shaft being substantially shorter than the distance between said opposed openings, a bearing carrier projecting inwardly through the other opening and removable therethrough, the inner end of the shaft being journalled in a bearing carried by the bearing carrier and having a gear mounted thereon adjacent its inner end, and a gear meshing with the gear mounted on said shaft.

2. Driving mechanism comprising a housing having opposed openings, a bearing carrier projecting inwardly through one of said openings and removable therethrough, the inner portion of said bearing carrier being supported by the housing, a shaft extending through the other of said openings with its inner end journalled in a bearing carried by the bearing carrier, said shaft being substantially shorter than the distance between said opposed openings, and a gear mounted on said shaft adjacent its inner end.

3. Driving mechanism comprising a housing having opposed openings, a gear rotatably supported substantially midway between said openings, a bearing carrier extending through one of said openings and removable therethrough, a shaft extending through the other of said openings with its inner end journalled in a bearing carried by the bearing carrier, said shaft being substantially shorter than the distance between said opposed openings, and a gear mounted on said shaft adjacent its inner end and meshing with said first mentioned gear.

4. Driving mechanism comprising a housing having opposed openings, either of which is adapted to receive a bearing carrier selectively, a bearing carrier removably received in one of said openings, a bearing carried thereby adjacent the mid-point between said opposed openings, a shaft extending through the other of said openings with its inner end journalled in the bearing carried by the bearing carrier, and a gear mounted on said shaft adjacent its inner end.

5. Driving mechanism comprising a housing having opposed openings, either of which is adapted to receive a bearing carrier selectively, a bearing carrier removably received in one of said openings, the inner portion of said bearing carrier being supported by the housing when the carrier is received in either opening, a bearing carried thereby adjacent the mid-point between said opposed openings, a shaft extending through the other of said openings with its inner end journalled in a bearing carried by the bearing carrier and a gear mounted on said shaft adjacent its inner end.

6. Driving mechanism comprising a housing having opposed recesses adapted to interchangeably receive bearing carriers, a bearing carrier removably received in one of said openings, a bearing carried thereby adjacent the mid-point between said opposed openings, a shaft extending through the other of said openings with its inner end journalled in the bearing carried by said bearing carrier, a gear mounted on said shaft adjacent its inner end and arranged substantially midway between said openings, and a bearing carrier removably received in the same opening as the shaft, said shaft being additionally journalled in a bearing carried by said last mentioned bearing carrier.

7. Driving mechanism comprising a housing having opposed openings, a shaft extending through one of said openings approximately half the length between said openings, a gear adjacent the inner end of said shaft and arranged substantially midway between said openings, bearing carriers having bearings for said shaft removably received in the openings in said housing, a bearing for the inner end of said shaft adjacent said gear being afforded by one of said carriers and said bearing carrier being supported by the housing adjacent said gear.

8. Driving mechanism comprising a housing open at opposite sides, a shaft extending into said housing through the opening at one side approximately half the length between said openings, said shaft carrying a gear adjacent its inner end, a bearing carrier secured in the opening through which said shaft extends, a bearing carrier secured in the other opening, the shaft being journalled in bearings carried by said bearing carriers, said bearing carriers being interchangeable to render said shaft reversible and operable from either side of said housing.

9. Driving mechanism comprising a housing open at opposite sides, a shaft extending from one side through one of said openings approximately half the length between said openings, a bearing carrier removably mounted in the opening and providing a bearing for the outer end of said shaft, an elongated bearing carrier removably mounted in the other of said openings and providing a bearing for the inner end of said shaft, said carriers being interchangeable to permit reversal of said shaft and the location of said driving mechanism on either side of said housing.

10. Driving mechanism comprising a housing open at opposite sides, a shaft extending into said housing from one side through one of said openings approximately half the length between said openings, said shaft carrying a central driving gear, a bearing carrier removably mounted in the opening and providing a bearing for the outer end of said shaft, an elongated bearing carrier removably mounted in the other of said openings and providing a bearing for the inner end of said shaft, said carriers being interchangeable to permit reversal of said shaft and the location of said driving mechanism on either side of said housing, the housing being provided with a supporting surface on each side of the central gear for engaging the elongated bearing carrier whereby the inner end of the same will be supported in either arrangement of the shaft and carriers.

In testimony whereof, I have hereunto subscribed my name this 30th day of April, 1929.

JOHN M. SHIMER.